Sept. 1, 1931.   L. COHEN   1,821,906
ART OF RADIOSIGNALING
Filed Feb. 27, 1930   2 Sheets-Sheet 1

Inventor
Louis Cohen,
By
Attorney

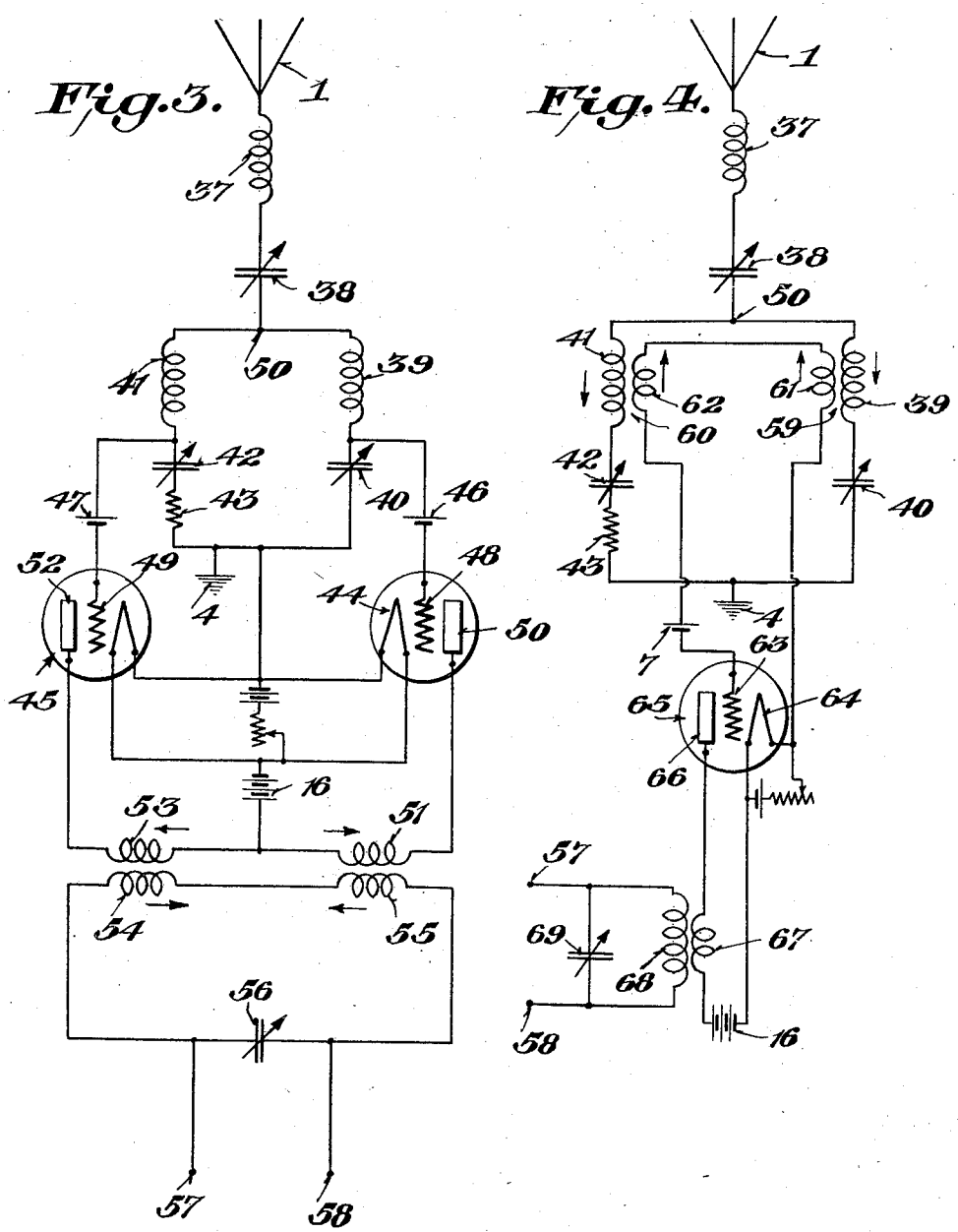

Patented Sept. 1, 1931

1,821,906

UNITED STATES PATENT OFFICE

LOUIS COHEN, OF WASHINGTON, DISTRICT OF COLUMBIA

ART OF RADIOSIGNALING

Application filed February 27, 1930. Serial No. 431,929.

This invention relates to the art of radio signaling, and has for its object providing improved methods and means for the selective reception of signals.

In my co-pending patent application, Serial No. 413,369, dated December 11, 1929, I have described a novel method for the selective reception of radio signals which consists in impressing the received signal energy on two independent oscillatory circuits, which are in adjustment for the same periodicity, but each having a different ratio of inductance to capacity, that is, one circuit having a larger inductance and a smaller capacity, and the other circuit having a smaller inductance and larger capacity, but the product of inductance and capacity in each of the two circuits is the same, and each of the two circuits is adjusted for resonance to the frequency of the particular signal desired to receive. The two oscillatory circuits being coupled to a common third circuit inducing in that third circuit E. M. F.'s of opposite directions. It was explained in the above referred to pending application that such a circuit system affords a means for securing a high degree of selectivity in the reception of signals. The method is effective in the elimination of interferences caused by signals emitted from other stations as well as interferences caused by irregular disturbances such as static discharges, and others.

This invention utilizes the same basic principle, that is, impressing the received signal energy on two independent oscillatory circuits which are of the same periodicity, but each having a different ratio of inductance to capacity, and balancing against each other either the voltages or currents generated in the two oscillatory circuits by the received signal acting on the system, by which only the signals of the particular frequency for which the circuits are in resonance adjustment are transmitted to amplifier and detector, and signals of all other frequencies or irregular disturbances are completely neutralized. This invention provides, however, for novel modifications in the utilization of these principles by which improvements are obtained in the operation of the system.

The invention and its mode of operation is best explained by reference to the accompanying drawings which form part of the specification.

Figure 1:
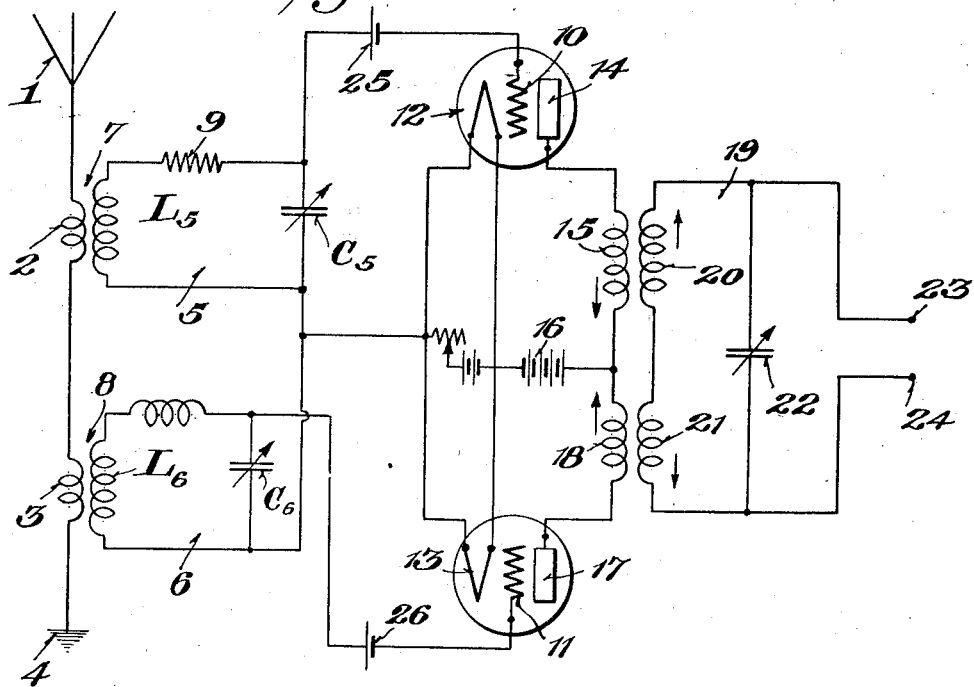
Figure 2:
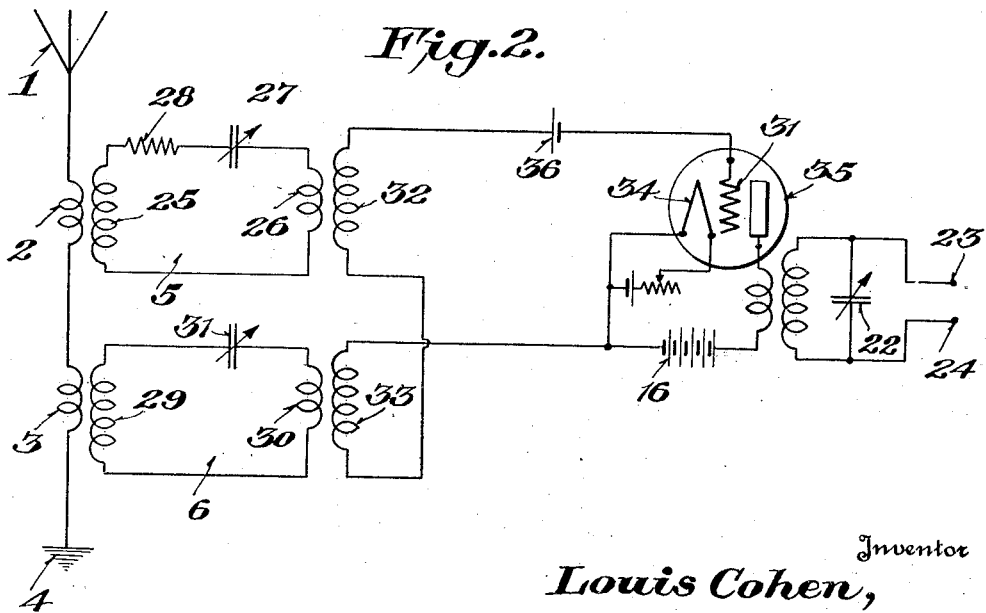

Fig. 1 is an embodiment of the invention in which the voltages generated by signals in two coupled oscillatory circuits are balanced against each other. Fig. 2 is a modification in which the currents produced by received signals in two coupled oscillatory circuits are balanced against each other. The arrangement shown in Fig. 3 provides for balancing the voltages of two branch circuits. Figure 4 is a modification in which the currents in two branch circuits are balanced.

Having particular reference to the drawings in which the same numbers designate corresponding parts in all figures, in Fig. 1, the antenna 1 is connected in series with the primary coils 2 and 3 and ground 4, constituting the antenna circuit. Two secondary circuits 5 and 6 are linked electrically with the antenna through transformers 7 and 8 respectively. The secondary circuit 5 comprises an inductance $L_5$ which is the secondary of the transformer 7, condenser $C_5$ and resistance 9. The secondary circuit 6 comprises inductance $L_6$ part of which is the secondary of transformer 8 and condenser $C_6$. Both of these circuits 5 and 6 are separately adjusted for resonance for the frequency of the signal desired to receive, that is the produce $L_5C_5$ is the same as the produce $L_6C_6$. The ratios, however, of $L_5$ to $C_5$ and $L_6$ to $C_6$ are different; we assume that $L_6$ is greater than $L_5$ and, therefore, $C_6$ is smaller than $C_5$. For the signal frequency for which the two oscillating circuits 5 and 6 are in resonance, the currents generated in those circuits by that particular signal are dependent on the resistance of these circuits and the mutual inductances between coils $L_5$ and $L_6$ and the antenna coils 2, 3 respectively. If the mutual inductances and the resistances for the two circuits are the same, the currents produced by the signals in these two circuits will be of the same intensities. Since coil $L_6$ is larger than coil $L_5$, its resistance is also larger, and in order that circuit 5 may have substantially the same resistance, an additional resistance 9 is introduced in that circuit. The voltages, however, across the condensers of the secondary circuits are proportional to the currents in the circuits and inversely proportional to the capacities of the condensers. Since the current intensities are the same and condenser $C_6$ is smaller than condenser $C_5$, it is obvious that the voltage across $C_6$ will be larger than the voltage generated across $C_5$. The voltages produced across the condensers of the two oscillatory circuits are separately impressed upon the grids 10 and 11 of the vacuum tube amplifiers 12 and 13, the plate 14 of tube 12 is connected in series with transformer coil 15 and battery 16, and the plate 17 of tube 13 is connected in series with transformer coil 18 and battery 16. The two transformer coils 15 and 18 are coupled to the oscillatory circuit 19 which comprises two transformer coils 20 and 21 and variable condenser 22. The terminals 23 and 24 of circuit 19 are the input terminals of another vacuum tube which may be either an amplifier or detector connected in the usual manner. Since the voltage across the condenser $C_6$ produced by the signals desired to receive is greater than the voltages across condenser $C_5$, the variation produced in the current of the plate circuit of 17, 18, 16, is correspondingly greater than the variation produced in the current of plate circuit 14, 15 16. The currents in these plate circuits are of opposite directions, as indicated by the arrow marks, and, therefore, induce E. M. F.'s of opposite directions in circuit 19. Since, however, the variable components of the currents in the plate circuits are of different magnitudes a resultant E. M. F. is produced in the oscillating circuit 19 which is transmitted to succeeding amplifiers and detector and observed in a suitable indicating instrument in the usual way. It is desirable to have the circuit 19 also adjusted for resonance for the frequency of the signal desired to receive; this will still further enhance the selectivity of the system and at the same time give a higher amplification.

To simplify the necessary adjustments in the system it is preferable to design the transformers so that transformers 7 and 8 are duplicates of each other and similarly a duplication of transformers 15, 20 and 18, 21 will insure the same values of mutual inductance between circuits 5 and 6 and the antenna respectively, and also the same values of mutual inductance between circuit 19 and the plate circuits 12, 15 and 17, 18 respectively. With these provisions if the transformers are properly designed no adjustments in the transformers will be required. It is also necessary to match the tubes 12 and 13 so that the same degree of amplification may be obtained from each. It is to be observed that provision is made to supply the plate circuits of the two tubes with the same voltage source, and the two filaments are also heated by the same battery. Independent biasing voltages 25, 26 are shown in the figure, but in this also it is preferable to use a single voltage source which can be readily realized by connecting a battery to a potentiometer, and applying equal voltage drops to the two grids.

For signals of frequencies different from the frequency for which the circuit system is in adjustment, the intensities of the currents generated in circuits 5 and 6 are no longer proportional to the resistances of the circuits, but to the reactances of the circuits. Since one circuit has a higher inductance and a smaller capacity than the other circuit, obviously the reaction of that circuit will be greater and in proportion to the ratio of the inductances in the two circuits, and the current intensity in that circuit will be correspondingly smaller and in the same ratio; that is, if $L_6$, for instance, is twice as great as $L_5$, and $C_6$ is one half as large as $C_5$, the current produced in circuit 6 will be one half the magnitude of that produced in circuit 5. Since, however, the capacity $C_6$ is one half as great as $C_5$, the voltage produced across that condenser by one half the current will be as great as that produced across the condenser $C_5$. In other words, though the currents in the two circuits are of different magnitudes, the voltages across the condensers are of the same magnitude. These voltages acting on the grids 10 and 11 accordingly produce variations in the plate currents of the two vacuum tube amplifiers of the same intensities, and these inducing E. M. F.'s of opposite directions in the oscillating circuit 19 will completely neutralize each other, and, therefore, produce no effect on the succeeding tube to which the terminals 23 and 24 connect. Whatever residual effect due to lack of perfect balance may be transmitted to circuit 19, it is further attenuated in that circuit due to the fact that the circuit is tuned for another frequency. As an illustration, a condition is mentioned where the inductance of an oscillatory circuit is twice as great as that of the other oscillatory circuit, but this is only by way of example, any other suitable ratio of inductances may be used. This arrangement offers a particularly effective means for the elimination by balancing interfering effects of signals of all other frequencies differing from the frequency of a particular signal for which the system is in resonance adjustment. This method is also very effective in the elimination of interferences caused by irregular disturbances such as static discharges and others. It can be shown that for irregular disturbances the currents produced in the two oscillatory circuits 5 and 6 are of exactly the same characters but of magnitudes inversely proportional to the inductances of the circuits. The voltages, however, across the condensers will be of the same magnitudes, and therefore, produce current variations in the plate circuits of tubes 12 and 13 of the same intensities and the same characters in every respect, and accordingly neutralize each other's effect in the common circuit 19, precisely in the same way as in the case of interfering signals of other frequencies discussed above.

Fig. 2 provides another modification in which the current effects in the two oscillatory circuits are balanced against each other through transformer action on the third circuit. Antenna 1 is connected through two primary coils 2 and 3 to ground 4. Two oscillatory circuits 5 and 6 are coupled to the antenna. Oscillatory circuit 5 comprises two transformer coils 25 and 26, condenser 27, resistance 28. Oscillatory circuit 6 comprises transformer coils 29 and 30 and condenser 31. The transformer coils 25 and 29 couple the oscillatory circuits 5 and 6 to the antenna circuit, and the transformer coils 26 and 30 couple the oscillatory circuits 5 and 6 to a third circuit which consists of grid 31, coils 32, 33 and filament 34. Here again, the oscillating circuits 5 and 6 are separately adjusted for resonance for the frequency of the particular signal to be received; the products of the inductance and capacity of each of the two circuits is the same. The ratio, however, of the inductance to capacity of one circuit is different from that of the other circuit, that is, in one circuit the inductance is large and the capacity is small, while in the other circuit the inductance is small and the capacity is large. For the circuit which has a larger inductance, the mutual inductance of that circuit with the tube circuit is to be greater, in the same proportion, than the mutual inductance of the other circuit with the tube circuit. If, for example, the inductance of circuit 6 is greater than the inductance of circuit 5, then the mutual inductance 30, 33 is to be greater in the same proportion than the mutual inductance 26, 30. Also the transformer coils 32 and 33 are connected oppositely so that the electromotive forces induced in circuit 31, 32, 33, 34 by the currents in the two oscillatory circuits are oppositely directed. For the resonance frequency the currents in the two circuits 5 and 6 are of the same magnitude if the resistances of the two circuits are the same, and this condition of equal resistances is secured by the introduction of the additional adjustable resistance 28 in circuit 5. Since, however, the mutual inductance 30, 33 is greater than 26, 32, the induced E. M. F. in the tube circuit from circuit 6 will be greater than that induced from circuit 5 and produce a resultant E. M. F. to act on the grid filament of tube 35, producing a variation in the plate current of the tube, and this variation in the plate current is transmitted to either the detector tube or succeeding amplifying tubes as desired. For signals of frequencies other than the resonance frequency, the currents produced in the two oscillatory circuits 5 and 6 will no longer be of the same magnitude. In this case it is the reactances of the circuits that determine the magnitude of the currents in the circuits. Since circuit 6 has a larger inductance and a smaller capacity, the reactances of that circuit will be greater than that of circuit 5 in the ratio of the inductances of these two circuits, and the current generated in that circuit will be smaller in the same ratio. Since, however, the mutual inductance 30, 33 is greater than the mutual inductance of 26, 32 in the same ratio, it follows that the smaller current in circuit 6 will induce an E. M. F. in the tube circuit of the same magnitude as that induced by the larger current of circuit 5, and these two E. M. F.'s being oppositely directed neutralize each other's effect completely, and, therefore, do not affect the grid in any way. Hence, such interferences are completely eliminated from the amplifiers and detector which may be associated with the tube 35 for detection of signals.

I have demonstrated that the argument outlined above relative to signals of frequencies different from the frequency for which the system is in adjustment applies to the case of interferences caused by irregular disturbances. Any irregular excitation of the antenna will set up in this system free oscillations the frequencies and dampings which are governed by the electrical constants of the antenna as well as the two oscillating circuits associated with the antenna. The currents produced by such free oscillations in the two oscillatory circuits have the same characteristics, that is, the same frequencies and the same damping factor, but of different magnitudes. In this case also it is the inductances of the circuits or the capacities of the circuits which determine the amplitudes of the oscillations. In the circuit of greater inductance the oscillations are of smaller amplitude. Since, however, the circuit which has a larger inductance is coupled more tightly to the tube circuit, the electromotive forces induced from the two circuits are the same but oppositely directed, and, therefore, produce no resultant effect on the grid filament of the tube. This arrangement, therefore, provides an effective means for selective signaling eliminating all interferences whether those caused by so called forced oscillations, the interferences from other stations, or interferences produced by disturbances of any other character.

Another embodiment of the invention is illustrated in Fig. 3 in which provision is made for connecting the antenna to two branch circuits which are of the same periodicity and different ratios of inductance to capacity. The antenna 1 is connected in series with inductance 37 and capacity 38, and at point 50 the circuit divides, one branch comprising inductance 39, capacity 40, ground 4, and the other branch comprising inductance 41, capacity 42, resistance 43, and ground 4. The two branch circuits 39, 40 and 41, 42, 43 are adjusted for the same periodicity, and each branch circuit to be separately in resonance for the frequency of the signal desired to be received; it is also preferable to have the antenna circuit 1, 37, 38 adjusted for resonance for the frequency of the signal desired to receive. The ratios, however, of inductance to capacity of the two branch circuits are different, the branch circuit 39, 40 having a higher ratio of inductance to capacity than the circuit 41, 42, 43, that is, inductance 39 is higher than inductance 41, while capacity 40 is smaller than capacity 42. It is desirable to have the resistances of the two branch circuits substantially the same, and for this reason provision is made to introduce resistance 43 to equalize the resistances in the two branch circuits. For the signals for which the circuits are in resonance, the currents in the two branches are of the same amplitudes if the resistances of the branches are substantially the same. Since condenser 40 is smaller than condenser 42, the voltage drop across that condenser is proportionally greater and, therefore, the voltage impressed on the grid 48 is greater than the voltage impressed on grid 49, and this will have the effect of producing a larger current variation in the plate circuit 50, 51 than the current variation produced in the plate circuit 52, 53. The currents in these two plate circuits induce E. M. F.'s of opposite directions in circuit 54, 55, 56, and since they are of different magnitudes a resultant E. M. F. is produced in that circuit generating a voltage across condenser 56 which may be transmitted to a detector or amplifier. For signals of frequencies other than those for which the system is in adjustment or for any irregular disturbances, the currents in the two branch circuits 39, 40 and 41, 42 are no longer proportional to the resistance but to the reactances of these two branch circuits. Since, however, the reactance of 39, 40 is greater than the reactance of 41, 42, the current in the branch circuit 39, 40 is correspondingly smaller than the current in the branch circuit 41, 42 and as a consequence the voltage generated across condenser 40 is of exactly the same value as the voltage produced across condenser 42, that is, for an interfering signal the voltages impressed on the grids 48 and 49 have the same values and produce current variations in the plate circuits of the two tubes 44 and 45 of the same magnitudes and the same character. Since the current variations in the plate circuits of the two tubes induce E. M. F.'s of opposite directions in circuit 54, 55, 56, and since they are of the same magnitudes and the same character, they will completely neutralize each other and produce no resultant effect whatsoever in that circuit. It will be readily recognized that the principle utilized in the arrangement shown in Fig. 3 is exactly the same as the one employed in connection with the arrangement shown in Figs. 1 and 2.

Fig. 4 is a modification of Fig. 3. Here again the antenna 1 is connected in series with the inductance 37 and capacity 38, and at the point 50 the circuit is divided, one branch comprising inductance 39, capacity 40, ground 4 and the other branch comprising inductance 41, capacity 42, resistance 43 and ground 4. The two branch circuits 39, 40 and 41, 42 are separately adjusted for the same periodicity and for resonance for the frequency of the signals desired to receive. The ratio, however, of inductance to capacity of branch 39, 40 is greater than the ratio of inductance to capacity of branch 41, 42, that is, inductance 39 is greater than inductance 41, and capacity 40 is smaller than capacity 42. The inductances 39 and 41 are the primaries of transformers 59 and 60; the secondaries of these transformers 61 and 62 are connected differentially so that the E. M. F.'s induced in 62 and 61 by the currents flowing in 41 and 39 are oppositely directed. It is also arranged that the mutual inductance between 61 and 39 is higher than the mutual inductance between 62 and 41, and in the same ratio that inductance 39 is greater than inductance 41. The terminals of the secondaries of transformers 60 and 59 are connected to grid 63 and filament 64 of the tube 65. The plate circuit 66, 67 is coupled to a tuned circuit 68, 69, the terminals of which constitute the input circuit of another amplifier tube or detector as desired in the usual way. It can be readily shown that in this arrangement also an effect is produced on the grid 63 only by signals of the particular frequency for which the branch circuits are in resonance adjustment. For signals of all other frequencies or irregular disturbances the induced E. M. F.'s in the two secondaries 61 and 62 balance each other and neutralize each other's effect in their action on the grid filament of the tube 65, and, therefore, produce no current variations whatsoever in the plate circuit 66, 67, and consequently no effect to be transmitted to succeeding tubes either amplifiers or detector tube. This arrangement also offers a satisfactory means for rendering signal reception free from interferences.

The underlying principle in the method proposed in this invention is to impress the signal energy on two oscillatory circuits whose periodicities are the same but one having a different ratio of inductance to capacity than the other, and balancing the electrical effects, that is, either the voltages or the currents in these two circuits against each other, neutralizing in this way all interferences and transmitting the reception of signals of a particular frequency for which the circuits are in resonance adjustment.

The principle of the invention is illustrated here in combination with an antenna for the reception of radio signals, but the method is applicable for the reception of signals which are transmitted in other ways, for instance, over a line or cable. The circuit system may be used at cable or line terminals for the reception of signals.

In Figures 1 and 2 the invention is illustrated in combination with an untuned antenna. The separate tuning of the antenna would be obvious to anyone skilled in the art and the invention shown in this application can be used with either a tuned or an untuned antenna.

Four methods for embodying this principle in practical circuit systems are shown and described in the specification. Other modifications, however, may readily suggest themselves to those skilled in the art for the utilization of the basic principle discussed here by which the desired results may be accomplished without departing from the spirit of this invention.

I claim:

1. The method of selective signaling which comprises impressing the signal energy on two oscillatory circuits of the same periodicity but each of the circuits having a different ratio of inductance to capacity; opposing the electrical effects produced in the two circuits against each other in their actions on a third circuit, and transmitting the resultant electrical effect produced in the third circuit to a detector and amplifier.

2. The method of selective signaling which comprises impressing the signal energy on two separate oscillatory circuits of the same periodicity but each of the oscillatory circuits having a different ratio of inductance to capacity; opposing the voltages produced in the said oscillatory circuits by the signal energy against each other in their actions on a third circuit, and transmitting the resultant effect in that third circuit to a detector and amplifier.

3. The method of selective signaling which comprises impressing the received signal energy on two separate oscillatory circuits both circuits having the same periodicity, but each oscillatory circuit having a different ratio of inductance to capacity; opposing the currents of the said two oscillatory circuits against each other in their electrical action on a third circuit, and transmitting the resultant electrical effect in that third circuit to a detector and amplifier.

4. The method of selective signaling which comprises impressing the signal energy on two separate oscillatory circuits, the two circuits being of the same natural frequency and each having the same resistance, but the ratio of inductance to capacity in each of the two circuits being different; opposing electrically the two oscillatory circuits against each other in their actions on a third circuit, and transmitting from that third circuit the resultant effect to a detector and amplifier.

5. The method of selective signaling which comprises impressing the signal energy on two oscillatory circuits of the same natural frequency, but each oscillatory circuit having a different ratio of inductance to capacity; associating each of the oscillatory circuits with a vacuum tube amplifier, combining differentially the effects in the output circuits of the vacuum tube amplifiers, and transmitting the resultant effect to a detector and an amplifier.

6. In a system for the reception of radio signals comprising an antenna, two separate oscillatory circuits coupled to the said antenna, each of said oscillatory circuits having the same periodicity, but a different ratio of inductance to capacity; the voltages produced across the condensers of the said two oscillatory circuits being impressed on the grids of two separate vacuum tube amplifiers; means for coupling the two plate circuits of the said two vacuum tube amplifiers to a common circuit, and means for transmitting the resultant effects produced in that common third circuit to a detector and amplifier.

7. In a system for the reception of radio signals comprising an antenna, two separate oscillatory circuits coupled to the said antenna, each of said oscillatory circuits having the same periodicity and substantially the same resistance, but the ratio of inductance to capacity in each of the said two oscillatory circuits being different; impressing the voltages produced across the condensers of the said two oscillatory circuits on the grids of two separate vacuum tube amplifiers; the plate circuits of the said two vacuum tube amplifiers being coupled to a third circuit inducing in that third circuit voltages of opposite directions; the said third circuit constituting the input circuit of either a detector or amplifying tube.

8. In a system for the reception of radio signals comprising an antenna, two separate oscillatory circuits coupled to the said antenna, each of the said oscillatory circuits being adjusted for resonance to the frequency of the signal which is desired to receive, and each of said oscillatory circuits having substantially the same resistance; the ratio, however, of the inductance to capacity being different for the said two oscillatory circuits; the voltages generated across the condensers of the said two oscillatory circuits being impressed on the grids of two separate vacuum tube amplifiers; the two plate circuits of the said two vacuum tube amplifiers being coupled to a common third circuit; the voltages induced in that said third circuit from the said two plate circuits being oppositely directed; the resultant voltage in that third circuit producing a current flow, and the effect being transmitted to either a detector or amplifier.

9. In a system for the reception of radio signals comprising an antenna, two separate oscillatory circuits coupled to the said antenna, each of said two oscillatory circuits being adjusted for resonance to the frequency of the signal desired to receive; the said two oscillatory circuits having substantially the same resistance, but each of said oscillatory circuits having a different ratio of inductance to capacity; the voltages generated across the condensers of the said two oscillatory circuits being separately impressed on the grids of two separate vacuum tube amplifiers; the plate circuits of the said two vacuum tube amplifiers being coupled to a third circuit; the voltages induced in that said third circuit from the said two plate circuits being oppositely directed, balancing out in that said third circuit effects due to interfering signals and leaving a resultant effect from the signal desired to receive.

10. In a system for selective signaling comprising an antenna, two separate oscillatory circuits coupled to the said antenna, each of said oscillatory circuits being adjusted for the same periodicity and each having substantially the same resistance, but each of said oscillatory circuits having a different ratio of inductance to capacity; the said two oscillatory circuits being coupled differentially to a third circuit, the couplings to said third circuit being so adjusted in magnitude and direction to neutralize in that said third circuit interfering effects, leaving a resultant effect for the particular signal desired to receive.

11. In a system for selective signaling comprising an atenna, two separate oscillatory circuits coupled to the said antenna, each of said oscillatory circuits being adjusted for the same periodicity and each having substantially the same resistance, but each of the said oscillatory circuits having a different ratio of inductance to capacity, the said two oscillatory circuits being also coupled differentially to a third circuit, the coupling to the said third circuit being so adjusted in magnitudes and directions to neutralize in that said third circuit interfering effects, leaving a resultant effect for the particular signal desired to receive, and transmitting that effect to suitable amplifier and detector.

12. In a system for the reception of radio signals comprising an antenna, two separate oscillatory circuits coupled magnetically to said antenna, each of the said two oscillatory circuits being adjusted for the same periodicity and each having substantially the same resistance, but each of the said oscillatory circuits having a different ratio of inductance to capacity; the said two oscillatory circuits being also coupled differentially to a third circuit, the mutual inductance of the oscillatory circuit which has the higher ratio of inductance to capacity to the said third circuit being greater than the mutual inductance of the other of said oscillatory circuit to the said third circuit; the said third circuit being the input circuit of another vacuum tube amplifier through which the signals are transmitted to a suitable detector and indicator.

13. In a system for the reception of radio signals, an antenna connected in series with tuning elements and two branch circuits, each of said two branch circuits being separately adjusted for resonance to the frequency of the signals desired to receive; the ratio of inductance to capacity of one of the said branch circuits being greater than that of the other of said branch circuits; means for applying the voltages developed by the received signals across the condensers of each of the said two tuned branch circuits to grid filaments of separate tube amplifiers, and transmitting the current variations produced in the plate circuits of said vacuum tube amplifiers to a common circuit; the said common circuit being associated with suitable means for amplifying and detecting the signals.

14. In a system for the reception of radio signals, an antenna, tuning elements, two branch circuits and ground connection, all connected in series, each of said two branch circuits being separately adjusted for resonance to the frequency of the signals desired to receive; the product of inductance and capacity being the same in each of the said two branch circuits, and the resistances in each of said two branch circuits being substantially the same; one of the said branch circuits having a higher inductance and a smaller capacity than the other of the said branch circuits; the voltages developed across the condensers of the said two branch circuits being applied to grid filaments of separate tube amplifiers, and means for transmitting the current variations produced in the plate circuits of said vacuum tube amplifiers to a common circuit, the said common circuit being associated with suitable means for amplifying and detecting the signals.

15. In a system for the reception of radio signals, an antenna, tuning elements, two branch circuits and ground connection, all connected in series, each of said two branch circuits being separately adjusted for resonance to the frequency of the signals desired to receive; in one of said branch circuits the inductance being greater and the capacity being smaller than the corresponding elements in the other of said branch circuits; the two branch circuits being differentially coupled to a third circuit, the said third circuit being associated with suitable means for amplifying and detecting the signals.

16. In a system for the reception of radio signals, an antenna, tuning elements, two branch circuits and ground connection, all connected in series, each of said two branch circuits having substantially the same resistance, and being separately adjusted for resonance to the frequency of the signals desired to receive; one of said branch circuits having a higher inductance and a smaller capacity than the corresponding elements in the other of said branch circuits; a common circuit coupled differentially to the said two branch circuits; the mutual inductance between the said common circuit and one of the said branch circuits which has the higher inductance being greater than the mutual inductance between the said common circuit and the other of said branch circuits which has the lower inductance; the said common circuit being associated with suitable means for amplifying and detecting signals.

17. In a system for the reception of radio signals, an antenna, tuning elements, two branch circuits and ground connection; each of said two branch circuits being separately adjusted for resonance to the frequency of the signals desired to receive; one of said branch circuits having a higher inductance and a smaller capacity than the corresponding elements of the other of said branch circuits; a common circuit coupled differentially to the said two branch circuits; the mutual inductance between the branch circuit of higher inductance and the said third circuit being greater than the mutual inductance between the branch circuit which has the lower inductance and the said third circuit; the ratio of the mutual inductances between the common circuit and the two branch circuits being the same as the ratio of the inductances of the said two branch circuits; the said common circuit being associated with suitable means for amplifying and detecting signals.

18. In a system for the reception of radio frequency signals comprising means for intercepting the received signal energy, two oscillatory circuits each adjusted to a resonance for the frequency of signals desired to receive; each of the said two oscillatory circuits having a different ratio of inductance to capacity; means for impressing the said intercepted signal energy on the said two oscillatory circuits, means for opposing the electrical effects produced by the signal energy in the said two oscillatory circuits to produce a resultant of the desired signal while balancing out undesired signals.

19. In a system for the reception of radio frequency signals comprising means for intercepting the received signal energy, two oscillatory circuits each adjusted to a resonance for the frequency of the signals desired to receive, each of the said two oscillatory circuits having a different ratio of inductance to capacity, a common third circuit; means for impressing the said intercepted signal energy on the said two oscillatory circuits; means for opposing the electrical effects produced by the signal energy in the said two oscillatory circuits in their action on the said common third circuit to produce in the said common third circuit a resultant of the desired signal while balancing out undesired signals.

20. In a system for the reception of radio frequency signals comprising means for intercepting the received signal energy, two oscillatory circuits each adjusted for resonance to the frequency of the signals desired to receive, some of the elements in one of the said two oscillatory circuits having different values than the corresponding elements of the other of the said two oscillatory circuits; means for impressing the said intercepted signal energy on the said two oscillatory circuits, means comprising vacuum tubes for opposing the electrical effects produced by the signal energy in the said two oscillatory circuits to produce a resultant of the desired signal while balancing out undesired signals.

In testimony whereof I hereunto affix my signature.

LOUIS COHEN.